(12) United States Patent
Kim et al.

(10) Patent No.: US 8,029,940 B2
(45) Date of Patent: Oct. 4, 2011

(54) MEA FOR FUEL CELL, METHOD FOR PREPARING THE SAME AND FUEL CELL USING THE MEA

(75) Inventors: Hyoung-Juhn Kim, Suwon-si (KR); Eun Ae Cho, Seoul (KR); Sung Pil Yoon, Seongnam-si (KR); Jonghee Han, Seoul (KR); Jaeyoung Lee, Incheon (KR); Tae-Hoon Lim, Seoul (KR); Suk-Woo Nam, Seoul (KR); Heung Yong Ha, Seoul (KR); Seong Ahn Hong, Seoul (KR); In-Hwan Oh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 971 days.

(21) Appl. No.: 11/606,047

(22) Filed: Nov. 30, 2006

(65) Prior Publication Data

US 2007/0287050 A1    Dec. 13, 2007

(30) Foreign Application Priority Data

Jun. 8, 2006    (KR) ........................ 10-2006-0051485

(51) Int. Cl.
*H01M 8/10*    (2006.01)

(52) U.S. Cl. ........................................... 429/465
(58) Field of Classification Search ...................... 429/33
See application file for complete search history.

(56) References Cited

U.S. PATENT DOCUMENTS

| | | | |
|---|---|---|---|
| 7,183,017 B2* | 2/2007 | Taft et al. ........................ | 429/33 |
| 2002/0001744 A1* | 1/2002 | Tsusaka et al. ................. | 429/42 |
| 2004/0013926 A1* | 1/2004 | Akita et al. ..................... | 429/33 |
| 2004/0159544 A1* | 8/2004 | Bocarsly et al. ............... | 204/296 |
| 2004/0241520 A1* | 12/2004 | Ha et al. .......................... | 429/33 |
| 2008/0026275 A1* | 1/2008 | Kourtakis et al. ............... | 429/33 |

FOREIGN PATENT DOCUMENTS

| | | |
|---|---|---|
| JP | 2006-019174 | 1/2006 |
| KR | 10-2001-0055897 A | 7/2001 |
| KR | 10-2004-0103198 A | 12/2004 |
| KR | 10-2005-0116435 A | 12/2005 |
| KR | 10-2006-0086531 A | 8/2006 |

* cited by examiner

*Primary Examiner* — Ula C. Ruddock
*Assistant Examiner* — Jacob Marks
(74) *Attorney, Agent, or Firm* — McDermott Will & Emery LLP

(57) ABSTRACT

Provided is an MEA for fuel cell containing hygroscopic inorganic material such as TEOS (tetraethylorthosilicate), zirconium propoxide or titanium t-butoxide.

8 Claims, 2 Drawing Sheets

MEA FOR FUEL CELL, METHOD FOR PREPARING THE SAME AND FUEL CELL USING THE MEA

BACKGROUND OF THE INVENTION

1. Field of the Invention

The present invention relates to an MEA (Membrane Electrode Assembly) for a fuel cell, a method for preparing the same and a fuel cell using the MEA, and more particularly, to an MEA, a method for preparing the same and a fuel cell using the MEA, wherein a fuel cell performance can be improved even under no humidification state or high temperature state in which the fuel cell is difficult to exhibit its performance.

2. Description of the Prior Art

Anodes and cathodes of most fuel cells are humidified so as to maintain their performance. For the humidification, most fuel cells require humidifiers, which make the fuel cells complicated, space usage in the fuel cells difficult and their preparation cost increased. Further, in case of the humidification, it is necessary to remove excessive moisture possibly resulting from the humidification. Accordingly, a research for operating a fuel cell under no humidification condition without humidifying both electrodes of fuel cell has been performed.

Meanwhile, there has been a research for solving the problem of excessive moisture by means of operating the fuel cell at a temperature of 100° C. or higher so as to maintain the moisture under gas state. Regarding this, in case of a fuel cell used for an automobile, when the fuel cell is operated at a temperature of 100° C. or higher, it exhibits many benefits. Accordingly, a research for operating the fuel cell at high temperatures of 100° C. or higher has been actively performed.

When the fuel cell is operated under no humidification state or high temperature state, since it is difficult for the fuel cell to exhibit its performance effectively, a solution for improving the performance is needed. However, there has been no solution with which a performance of a fuel cell can be improved in an efficient and simple manner under no humidification state or high temperature state.

SUMMARY OF THE INVENTION

Accordingly, the present invention has been made to solve the above problems occurring in the prior art.

An object of the invention is to provide an MEA for a fuel cell, a method for preparing the same and a fuel cell using the MEA, wherein a fuel cell performance can be improved even under no humidification state or high temperature state in which the fuel cell is difficult to exhibit its performance, a problem of managing water often occurring in case of humidification can be solved, a humidifier itself can be removed, and to this end, a space of the fuel cell can be used efficiently and the preparation cost of the fuel cell can be highly lowered.

In order to accomplish the above object, there is provided an MEA for fuel cell containing hygroscopic inorganic material.

In order to accomplish the above object, there is provided a fuel cell comprising an MEA for fuel cell containing hygroscopic inorganic material.

In order to accomplish the above object, there is provided a method for preparing an MEA for fuel cell comprising a step of containing hygroscopic inorganic material in the MEA.

According to an embodiment of the invention, the hygroscopic inorganic material is one or two selected from the group consisting of tetraethylorthosilicate (TEOS), zirconium propoxide and titanium t-butoxide.

According to an embodiment of the invention, the hygroscopic inorganic material is contained in an amount of 0.01 g~0.1 g.

According to an embodiment of the invention, the hygroscopic inorganic material is contained at a membrane side and/or an electrode side in the MEA.

According to an embodiment of the invention, the hygroscopic inorganic material is contained in the MEA by immersing a nafion membrane in a mixture solution, in which the hygroscopic inorganic material, methanol and water are mixed, drying the nafion membrane, and thereby preparing a polymer composite membrane.

According to an embodiment of the invention, the hygroscopic inorganic material is contained in the MEA by adding the hygroscopic inorganic material to a nafion solution, applying the mixture on a glass plate, and thereby preparing a polymer composite membrane.

According to an embodiment of the invention, the MEA is prepared by mixing catalyst and the hygroscopic inorganic material and then applying the mixture on the polymer composite membrane prepared.

DETAILED DESCRIPTION OF THE PREFERRED EMBODIMENTS

Figure 1:
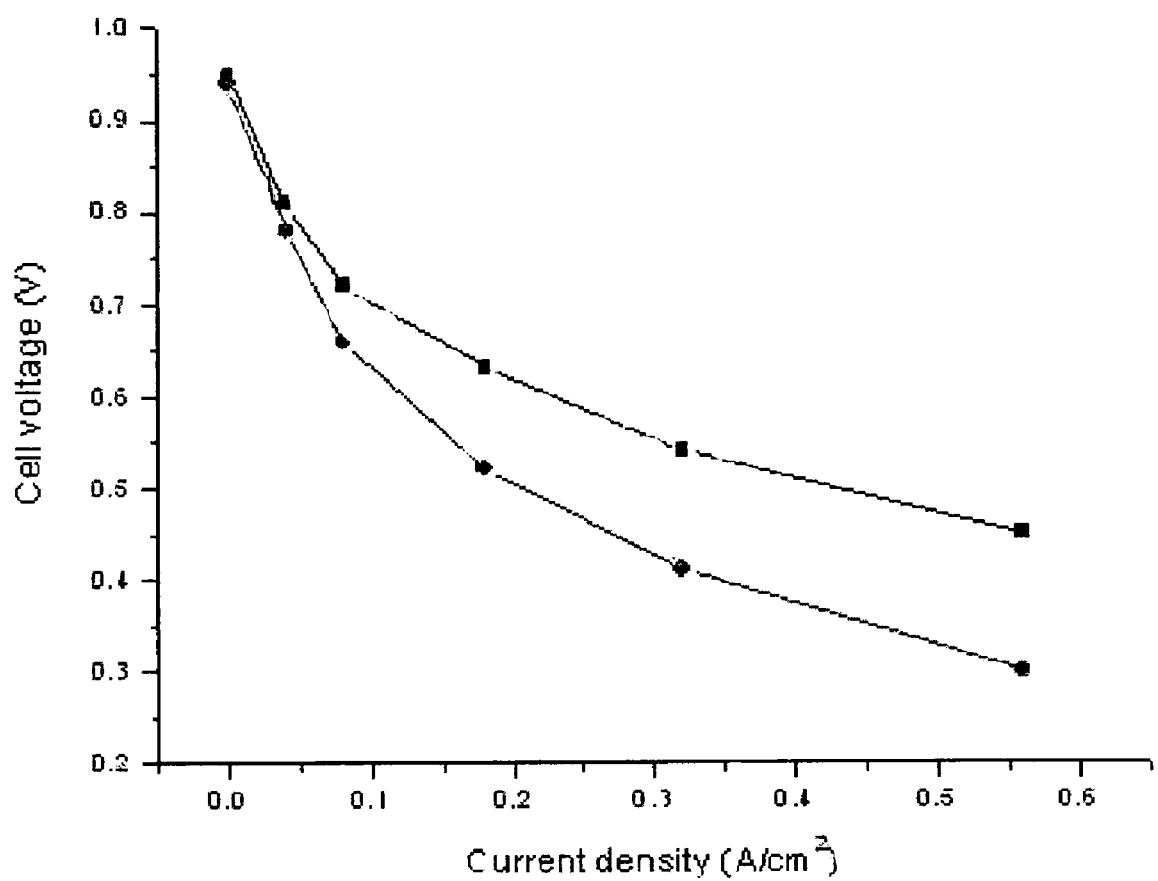
FIG. 1 is a graph showing a polarization curve of MEA when an MEA prepared according to an examples 1 of the invention and a conventional MEA, which is a comparative example, are operated at 120° C. and under atmospheric pressure without external humidification.

According to the invention, a hygroscopic inorganic material is contained in an MEA so as to improve a performance of a fuel cell under no humidification state or high temperature state in which the fuel cell is difficult to exhibit its performance.

As the hygroscopic inorganic material, one or two selected from the group consisting of tetraethylorthosilicate (TEOS), zirconium propoxide and titanium t-butoxide is used. The material is preferably used in an amount of 0.01 g or more in order for the hygroscopic inorganic material to exhibit its hygroscopic property in a fuel cell. Further, the material is preferably used in an amount of 0.1 g or less so as to prevent the hygroscopic inorganic material itself from serving as an impurity.

According to the invention, in order to make the hygroscopic inorganic material contained in an MEA, the hygroscopic inorganic material is added to a solvent or nafion solution, etc. when conducting a typical hot press method, a direct coating method and the like for preparing the MEA, so that the hygroscopic inorganic material is contained in a polymer electrolytic membrane or entire MEA.

Specifically, a polymer composite membrane can be prepared by immersing a nafion membrane in a mixture solution of an inorganic material, methanol and water and drying the nafion membrane, or by adding the hygroscopic inorganic material to the nafion solution, uniformalizing the mixture and then uniformly applying the mixture on a glass plate.

Meanwhile, an MEA can be prepared by further adding the hygroscopic inorganic material to catalyst, applying the mixture on the polymer composite membrane prepared and drying it to prepare the MEA.

After that, a gas diffusion layer, a bipolar plate and an end plate are respectively fixed to both sides of the prepared MEA, thereby completing a fuel cell.

According to the invention, it is possible to effectively and easily improve a performance of a fuel cell even under no humidification state or high temperature state in which the fuel cell is difficult to exhibit its performance, to solve a problem of managing water often occurring in case of humidification and to remove a humidifier itself, which makes a space of the fuel cell efficiently used and a preparation cost of the fuel cell highly lowered.

Hereinafter, the present invention will be described more in detail with reference to following examples.

EXAMPLE 1

Preparation of a Polymer Composite Membrane

A nafion membrane was immersed in a mixture, in which methanol, water and TEOS (tetraethylorthosilicate) were mixed in a ratio of 1:1:2 (by weight), for 10 minutes (this time can be varied between one minute and 20 minutes) and then dried in a vacuum oven at 100° C. for 20 hours. The prepared membrane was washed by water and methanol for several times, thereby preparing a polymer composite membrane.

EXAMPLE 2

Preparation of a Polymer Composite Membrane

TEOS (tetraethylorthosilicate) was mixed in the nafion solution (20 wt %) in an amount corresponding to 5 wt % (1 wt % to 10 wt % can be added) of a nafion polymer amount. The mixture was uniformalized by ultrasonic treatment for 1 hour and then stirred for one hour. The prepared polymer solution was uniformly applied on a glass plate using a doctor blade and dried, thereby preparing a polymer composite membrane having a thickness of 50 mm.

<Preparation of Electrode and MEA>

5 wt % nafion solution (4 g), Pt/C (40 wt %, 0.36 g), TEOS (0.05 g) and HCl (0.01 g) were mixed in 200 ml of 2-propanol. This mixture was uniformalized by the ultrasonic treatment for 1 hour and then applied to each of the prepared polymer composite membranes. Each of the prepared MEAs was dried at 60° C. for one day and then used for a cell test. Herein, a platinum loading amount was 0.4 mg/cm$^2$ for the anode and the cathode, respectively.

<Preparation of a Unit Cell and Test for Assessing its Performance>

A gas diffusion layer (SGL30BC), a bipolar plate and an end plate were respectively fixed to both sides of the prepared MEA, thereby preparing a unit cell. Then, a performance of the cell was tested. Meanwhile, herein, the MEA also can be prepared by introducing a catalyst layer into the gas diffusion layer and then hot-pressing (1500 psi, 140°C., 2 minutes) the layers to each of the polymer composite membranes.

Figure 2:
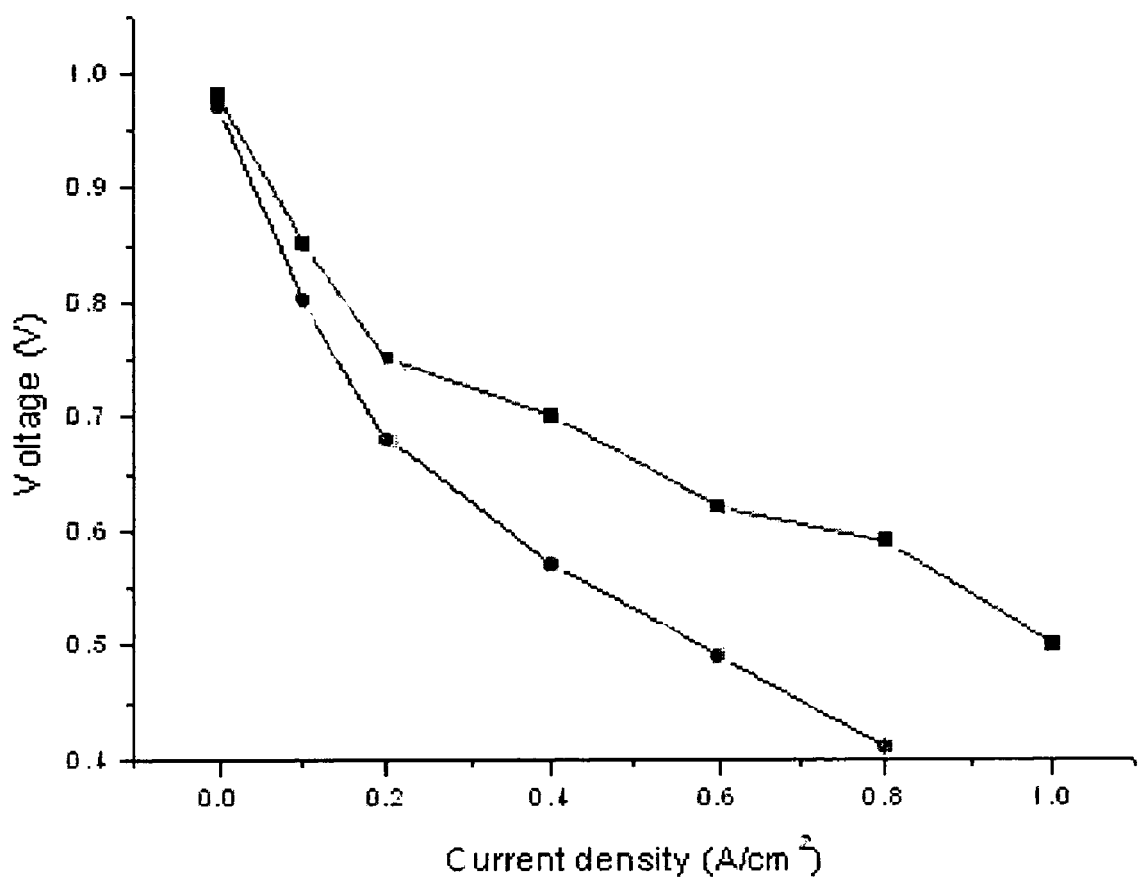
FIG. 2 is a graph showing a polarization curve of MEA when an MEA prepared according to an example 1 of the invention and a conventional MEA, which is a comparative example, are operated at 50° C. and under atmospheric pressure without external humidification.

FIG. 1 is a graph showing a polarization curve of MEA when an MEA prepared according to the example 1 of the invention and a conventional MEA, which is a comparative example, are operated at 120° C. and under atmospheric pressure without external humidification, and FIG. 2 is a graph showing a polarization curve of MEA when an MEA prepared according to the example 1 of the invention and a conventional MEA, which is a comparative example, are operated at 50° C. and under atmospheric pressure without external humidification.

In the tests regarding FIGS. 1 and 2, the anode and the cathode were supplied with hydrogen and air, respectively. In each graph, ● indicates polarization data of MEA of a comparative example and ■ indicates polarization data of MEA of the example 1.

As can be seed from FIGS. 1 and 2, the MEA of the example 1 exhibited the more excellent performance even under high temperature conditions of 120° C. as well as 50°C. , as compared to the MEA of the comparative example.

Therefore, it can be seen that the performance of the fuel cell is sufficiently improved according to the invention even under no humidification state or high temperature state in which the fuel cell is difficult to exhibit its performance.

What is claimed is:

1. An MEA for fuel cell containing hygroscopic inorganic material, wherein the hygroscopic inorganic material is contained at a membrane side and/or an electrode side of the MEA and the hygroscopic inorganic material is one or two selected from the group consisting of zirconium propoxide and titanium t-butoxide.

2. The MEA according to claim 1, wherein the hygroscopic inorganic material is contained in an amount of 0.01 g~0.1 g.

3. A fuel cell comprising an MEA for fuel cell containing hygroscopic inorganic material, wherein the hygroscopic inorganic material is contained at a membrane side and/or an electrode side of the MEA and the hygroscopic inorganic material is one or two selected from the group consisting of zirconium propoxide and titanium t-butoxide.

4. A method for preparing an MEA for fuel cell comprising a step of containing hygroscopic inorganic material in the MEA, wherein the hygroscopic inorganic material is contained at a membrane side and/or an electrode side of the MEA and the hygroscopic inorganic material is one or two selected from the group consisting of zirconium propoxide and titanium t-butoxide.

5. The method according to claim 4, wherein the hygroscopic inorganic material is contained in the MEA by immersing a sulfonated tetrafluoroethylene membrane in a mixture solution, in which the hygroscopic inorganic material, methanol and water are mixed, drying the sulfonated tetrafluoroethylene membrane, and preparing a polymer composite membrane.

6. The method according to claim 5, wherein the MEA is prepared by mixing catalyst and the hygroscopic inorganic material and applying the mixture on the polymer composite membrane prepared.

7. The method according to claim 4, wherein the hygroscopic inorganic material is contained in the MEA by adding the hygroscopic inorganic material to a sulfonated tetrafluoroethylene solution, applying the mixture on a glass plate, and preparing a polymer composite membrane.

8. The method according to claim 7, wherein the MEA is prepared by mixing catalyst and the hygroscopic inorganic material and applying the mixture on the polymer composite membrane prepared.

* * * * *